United States Patent [19]

Mehnert

[11] Patent Number: 4,751,614

[45] Date of Patent: Jun. 14, 1988

[54] CABLE HAVING A PROTECTING MULTI-LAYER SHEATH

[75] Inventor: Walter Mehnert, Ottobrunn, Fed. Rep. of Germany

[73] Assignee: MITEC Moderne Industrietechnik GmbH, Fed. Rep. of Germany

[21] Appl. No.: 888,662

[22] Filed: Jul. 23, 1986

[30] Foreign Application Priority Data

Jul. 26, 1985 [DE] Fed. Rep. of Germany ....... 3526839
Jun. 19, 1986 [DE] Fed. Rep. of Germany ....... 3620595

[51] Int. Cl.[4] ............................................. H04Q 5/00

[52] U.S. Cl. .................................... 361/437; 361/107; 174/36; 174/106 SC

[58] Field of Search ............... 174/36, 106 R, 106 SC; 361/107, 437

[56] References Cited

U.S. PATENT DOCUMENTS 4,281,212 7/1981 Bogese, II ............................ 174/36
4,441,107 4/1984 Chaborski et al. ............ 340/870.16
4,506,235 3/1985 Mayer .................................. 174/36
4,647,714 3/1987 Goto .................................... 174/36

*Primary Examiner*—A. D. Pellinen
*Assistant Examiner*—Jeffrey A. Gaffin
*Attorney, Agent, or Firm*—Sughrue, Mion, Zinn, Macpeak, and Seas

[57] ABSTRACT

In order to protect a cable, which can be laid in the soil and the conductors of which are electrically conductively connected with a plurality of electrical circuit units, which are arranged distributed at spacings along the cable in the interior of the cable core (2), which is surrounded by a sheath, which comprises a layer of high electrical conductivity and an outer layer for protection against chemical influences, reliably against electrical and magnetic disturbances coming from outside, the sheath additionally displays an inner layer of a material of high magnetic permeability. Beyond that, the outer layer can possess an electrical conductivity, the value of which lies between the conductivity values of the surrounding soil and the middle layer. In order to be able to produce such a cable as simply as possible, the circuit units are first electrically conductively connected with the conductors and then embedded together with these in the inner protective layer of the cable, for example by extruding-in.

27 Claims, 2 Drawing Sheets

CABLE HAVING A PROTECTING MULTI-LAYER SHEATH

FIELD OF THE INVENTION

The invention concerns a cable having a cable core comprising a plurality of electronic circuit units which in particular comprise measuring sensors and are arranged spaced apart from each other and distributed over the length of the cable, and several conductors at least some of which are connected in an electrically conductive manner with said electronic circuit units, and a protective multi-layer sheath surrounding said core.

BACKGROUND OF THE INVENTION

In a known cable of this kind, as for example disclosed in German Pat. No. 33 05 246, the core of the cable is formed by an insulating layer of flat rectangular cross-section, in the interior of which the conductors of the cable are so arranged in immediate proximity of the one flat side of the core that they extend in longitudinal direction of the cable one parallel to the other in about one plane. Spaced apart recesses extend from the other flat side of the cable core into the insulating layer. In these recesses electronic circuit units are arranged, the recesses having dimensions which are appreciably greater than the dimensions of the electronic circuit units. The gaps between each of the electronic circuit units and the respective recess surrounding it are filled out with a permanently elastic, electrically insulating mass for protection against polution and moisture. The thus formed core of the known cable is surrounded by a multi-layer sheath which comprises a wrapped around tape with components swelling up on access of water, a layer of a material having a high electrical conductivity and a layer of a plastomeric or elastomeric synthetic material which is to protect the inner parts of the cable against chemical influences coming from outside.

The structure of this known cable can lead to serious disadvantages, since a sheath made up of wound tapes and an outer synthetic material layer in the case of a direct laying of the cable in the soil does not afford adequate protection against moisture, other chemical influences and especially against electrical and magnetic disturbing influences as they are for example caused by lightning strikes in the direct proximity of the cable.

Therefore it is an objective of the invention to provide a cable of the initially named kind that possesses a simple structure, is favourable in costs and even under extreme conditions of use assures an excellent protection of the circuit units integrated into the cable against environmental influences of all kinds.

SUMMARY OF THE INVENTION

In practicing the invention I proceed from the recognition that a layer of high electrical conductivity, which forms part of the sheath and the cross-section of which is sufficiently small in order to assure at least a certain flexibility of the cable, on its own does not form a perfect Faraday cage which in the case of high loading, for example on a lightning strike through the soil to a cable laid in the ground, could prevent the generation of dangerous longitudinal voltages in the interior of the cable, which lead to a damaging or destruction of the comprised electronic circuit units. When the layer of high electrical conductivity has a thickness of only a few tenths of millimeters, as is required because for an easy handling and a low weight of the cable, the eddy currents induced in this layer in the case of a lightning strike do not suffice in any manner to keep the generated electrical charges on the outside of the electrically conducting layer and prevent them from getting to the inside of the layer, where they then in longitudinal direction of the cable lead to a voltage drop which rises in proportion to the distance from the place of strike and which by far exceeds the permissible value. This is also true even if one increases the thickness of the electrically well-conducting layer to a few millimeters. Although the weight and the flexibility of the cable are appreciably impaired hereby, the improved formation of eddy currents is however largely again compensated thereby, that an appreciably prolonged dwell path of the lightning on the cable arises through the lower electrical resistance of the conducting layer. The electrically well-conducting layer would thus have to possess a thickness of a few centimeters if were to effect by its own an adequate protection of the interior of the cable against longitudinal voltages. Such a layer thickness would however make a rod or a tube out of the "cable" which could no longer be produced endlessly, be wound on a drum and drawn off from this for laying.

These problems find a surprising solution by providing a further layer inside that layer of high electrical conductivity, this further layer consisting of a material of high magnetic permeability. Even when the layer of high electrical conductivity is only a few tenths of a millimeter thick, the skin effect is increased by providing said additional layer to such an extent that dangerous longitudinal voltages due to a lightning strike are prevented by charge displacement from penetrating into the core of the cable. The layer of high electrical conductivity takes over the current and prevents that the layer of high magnetic permeability, the high skin effect of which is desired, goes into saturation. In order to keep the dwell distance of the lightning as short as possible on the electrically well-conducting layer, a layer thickness of 0.2 to 0.3 millimeters has proved to be optimal. Such thickness can be realised readily, for example with the aid of a correspondingly thick aluminium or copper foil. Since the desired effect can be attained with a layer of high magnetic permeability, which likewise is only a few tenths of a millimeter thick and for example consists of one or more correspondingly thin mu-metal foils, an excellent screening effect results according to the invention without the cable hereby becoming particularly heavy or being impaired in its flexibility. Beyond that, the layer of high magnetic permeability prevents the ingress of magnetic disturbances into the interior of the cable and thereby an inductive coupling-in of electrical voltages into the conductors of the cable.

An additional improvement in the screening effect of both the just described layers can be obtained by making the outer layer, serving primarily for protection against chemical influences, not of an insulating material but of a material, which though it possesses a high chemical resistance, such as for example polyethylene or a similar synthetic material, beyond that however also has a certain electrical conductivity, which though smaller than that of the extremely well-conducting middle layer of the sheath, is yet greater than or is in the same order of magnitude as the electrical conductivity of the medium is to for example of the soil, into which the cable shall be laid. Through these measures, it is possible that the great charge quantities, which for example in the case of a lightning stroke get by way of the soil into the cable onto the electrically well-conducting layer of the sheath, due to the conductivity of the outer layer of the sheath, flow back again rapidly from there by way of the surrounding soil to the "earth" which is to be regarded as a remote cylinder wall lying co-axially with the cable. Thus, due to the conductivity of the outer cable layer, the dwell path of a lightning on the cable is shortened additionally and the magnitude of longitudinal voltages building up is thereby limited to still lower values which are with certainty not dangerous.

If one were to produce the outer layer of the sheath from an electrically well-insulating material, then this layer would act like the dielectric of a capacitor, the plates of which are formed on the one hand by the soil and on the other hand by the electrically well-conducting middle layer of the sheath. In order to avoid that such a dielectric is punctured on a lightning stroke and thereby destroyed locally, which at this place would lead to a cancellation of its protective effective against chemical influences, it would have to be constructed with a very great wall thickness. This would however again impair the weight and the flexibility of the cable. Thus, the fact that the outer layer of the sheath possesses a certain electrical conductivity, contributes not only to an improved screening effect against electrical disturbances, but also to the attainment of good mechanical properties of the cable.

Since a cable according to the invention is in the regular case so employed that its conductors are at least at one end of its ends electrically conductively connected with a central control and measurement unit which serves for the driving of the electronic circuit units disposed in the cable and/or for the detection and evaluation of the measurement values delivered by the circuit units, it is furthermore provided that at least all circuit units of the central control and measurement unit, which are electrically connected with the cable, are surrounded by an electrically well-conducting screening arrangement which is electrically conductively connected with the electrically well-conducting middle layer of the cable sheath and thus together with this forms a Faraday cage which is completed through electrically conductive terminations at possibly present free cable ends. It is provided that, this Faraday cage is not penetrated by electrical conductors at any place. This means that any feeding of information into or out of the cable, which does not take place from the central control and measurement unit, is performed for example with the aid of light-conducting fibres or directly in optical manner. An electrical power supply for the electronic circuit units disposed in the cable is arranged in the central control and measurement unit and consists either of batteries which are arranged within the Faraday cage or of a power supply unit, the transformer of which is disposed with its secondary winding inside the Faraday cage and with its primary winding outside the Faraday cage.

DESCRIPTION OF PREFERRED EMBODIMENTS OF THE INVENTION

Figures 1, 2:
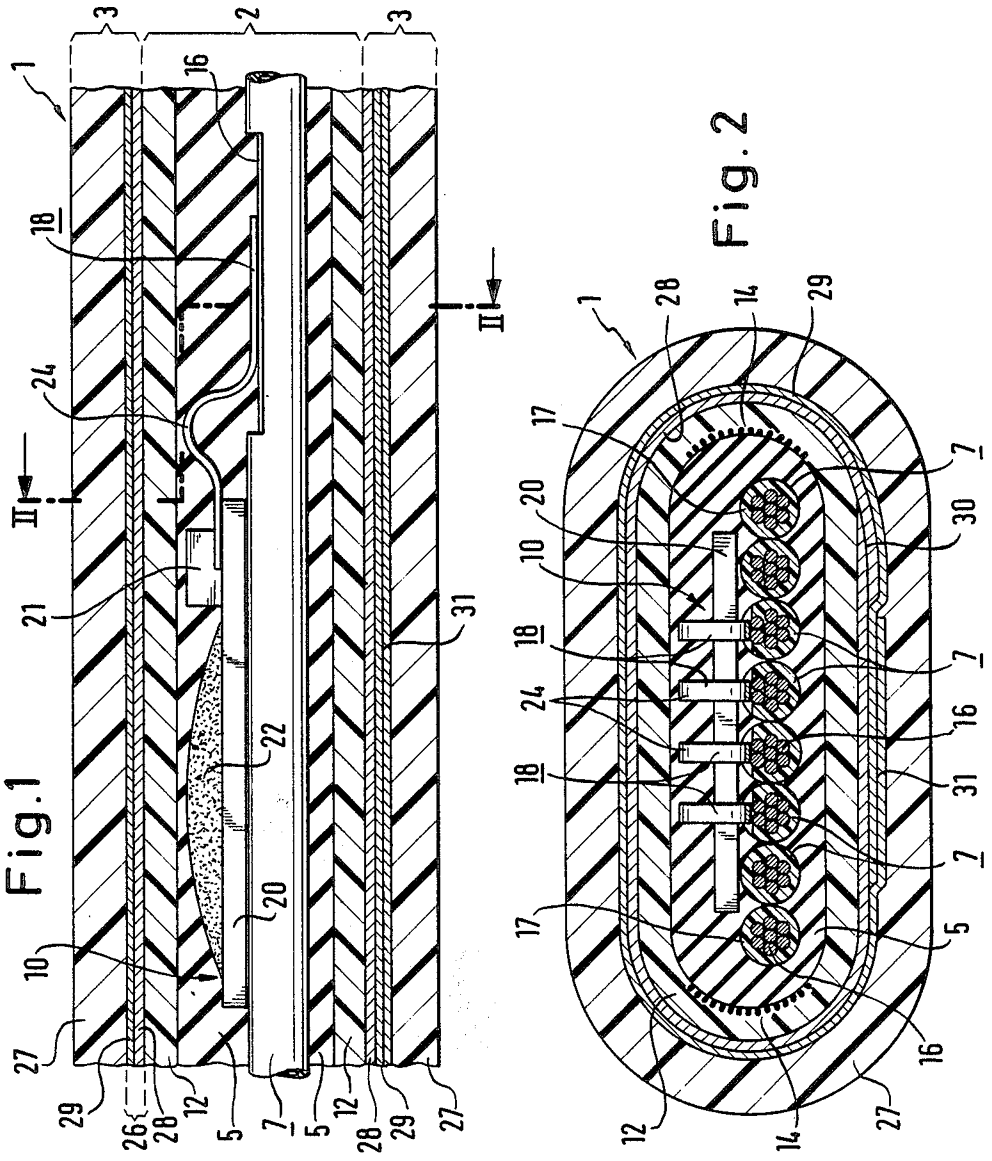
FIG. 1 a section extending in longitudinal direction through a cable according to the invention at a place, at which a circuit unit is disposed, FIG. 2 a section along the line II—II of FIG. 1 and FIG. 3 a cable, according to the invention, which together with the circuit units of a central control and measurement unit is completely enclosed in a Faraday cage.

As is evident from the FIG. 1, a cable 1 according to the invention consists of a core 2 and a sheath 3 surrounding the core 2, wherein each of both these subunits comprises several components.

Thus, the core 2 comprises an inner protective layer 5, which in the present case consists of an insulating material, for example a rubber-elastic mixture and into which the core leads 7 of the cable as well as the electronic circuit units 10, which are arranged at spacings one from the other in longitudinal direction of the cable 1, are completely embedded and hereby insulated electrically and protected against moisture and dirt. In order to attain this, the circuit units 10 are preferably mechanically as well as also electrically conductively connected with at least some of the core leads 7 and extruded together with all core leads 7 into the inner protective layer 5.

The core 2 furthermore comprises a second protective layer 12, which for example consists of PVC and completely so surrounds the inner protective layer 5 that both these layers are freely movable one relative to the other. This gives the cable 1 a high flexibility so that it can be laid at small radii of curvature and/or wound onto a supply drum without formation of folds.

As is evident particularly from the FIG. 2, traction relief elements 14, which can for example consist of fibres of KEVLAR, steel or carbon, are provided between the inner protective layer 5 and the outer protective layer 12.

Particularly the FIG. 2 furthermore shows that each of the cable core leads 7 comprises a conductor 16 which consists of several wires twisted together and is surrounded by an insulating sleeve 17. The core leads 7 are so arranged in one plane that the sleeves 17 of mutually adjacent core leads 7 each touch along an envelope line extending in longitudinal direction and are firmly connected one with the other in this contact region. Thus, the core leads 7 form a flat tape, which can be manipulated in simple manner, already before their installation in the cable 1. For fastening the circuit units 10 before the extruding into the inner protective layer 5, a part of the insulating sleeve 17 is removed from the core leads 7, with which the respective circuit unit 10 shall be connected, so that the conductors 16 lie free and can be electrically conductively connected, for example through soldering or welding, with the connecting pins 18 of the circuit unit concerned. In FIG. 2, such a connection with the middle four core leads 7 of the cable 1 is illustrated, while a pair of core leads 7 each time passes through without being connected with the circuit unit 10 represented there. In place of some of the shown electrically conducting core leads 7 or additionally to these, a cable according to the invention can also comprise one or more optical fibre conductors which serve for the optical information transmission and are spun around by traction-relieving elements.

The circuit unit 10 illustrated in the figures comprises a substrate 20, which is for example constructed as printed circuit board or as thick layer substrate. It serves on the one hand as mechanical support for the components of the circuit unit 10, which are symbolised in FIG. 1 in schematic manner by a rectangle 21 or a casting mass drop 22. On the other hand, the substrate 20 also carries printed lines which are not visible in the FIGS. 1 and 2 and are required for connecting the components on the substrate 20, one with the other end with the connecting pins 18.

As is evident particularly from the FIG. 1, the connecting pins 18 possess a portion 24, which is bent away convexly from the core leads 7 and perpendicularly to the longitudinal direction of the cable and which extends to shortly below the surface of the inner protective layer and displays sharp side edges. In this manner, a weak point in the insulation and high field strength are created between the portion 24 and the metallic conductors 28 and 29 embedded in the sheath 3 of the cable 1 so that a direct discharge of the conductors 16 can take place in case a disturbing electrical potential should build up in the interior of the cable sheath in spite of the protective measures described more exactly further below. Beyond that, the portion 24 of the connecting pins 18 serves for traction relief in case it should come to a relative movement between the substrate 20 and the cable core leads 7.

As the figures clearly show, the cable core leads 7 are, particularly with the blank parts of their conductors 16 and the circuit units 10 with their components 21 and 22 and their connecting pins 18, thus embedded entirely into the innermost protective layer 5 of the cable core 2 and thus in every case protected adequately against dirt, moisture and other chemical influences in all those cases of application, in which no extremely high demands are set. It is in that case not absolutely necessary that the cable core leads 7 possess an individual insulating sleeve 17. Instead thereof, the circuit units 10 could also during the manufacture of the cable initially be mounted on uninsulated conductors 16, which by suitable measures are held at a spacing one from the other, and then be embedded together with these in the innermost protective layer 5. It is also not absolutely necessary that the cable core leads 7 are arranged in one plane in the illustrated manner. Rather, they could also be arranged on one or more concentric circles around a common centre, as seen in the cross-section of the FIG. 2, so that a round cable results in the end effect. Furthermore, it is possible to twist the cable core leads 7 together, wherein preferably a changing lay is employed in order to attain an additional protection against electromagnetic interferences coupled in from outside. Employed as substrates for the circuit units 10 in both the last mentioned cases are preferably not rigid circuit plates or ceramic platelets, but for example KAPTON foil pieces which carry the electrical components and the conductor lines required for their connection and are laid from outside around the core lead bundle. The electrically conductive connection between the connection pins of the circuit units 10 and the conductors 16 of the cable core leads 7 can also take place through crimping or another squeezing-on operation, for which the insulating sleeve 17 of the cable core leads 7 is punctured mechanically without an insulation removal operation being required previously. Furthermore, it is not required that the protective layer 5 necessarily consists of an insulator with extremely low electrical conductivity. Rather, a thin film of an insulating material, for example of TEFLON, can be applied onto the core leads 7 and the circuit units 10 before the embedding during the assembly of the cable and then, for the formation of the protective layer 5, a mass can be employed, which possesses an electrical conductivity, the value of which lies between the conductivity values of insulators on the one hand and metallic conductors on the other hand. In conjunction with the protective measures still to be described in the following, an increased security can hereby be attained against electromagnetic disturbances coming from outside.

As the FIGS. 1 and 2 show, the cable core 2 is surrounded by a sheath 3, which consists of a metallic screening arrangement 26 against electromagnetic disturbances and an outer layer 27, which protects the screening arrangement 26 against chemical influences.

For moderate requirements, the screening arrangement 26 can for example consist of a screening plait of copper-plated iron, i.e. thus of two components, of which one is a metal of high magnetic permeability and the other a metal of high electrical conductivity. In order to assure an adequate protection, such a screening plait must however display a comparatively great thickness which leads to an increased weight of the cable. Beyond that, it is difficult to build up a moisture barrier with such a plait already in the sheath. Furthermore, the screening factor is relatively low.

For that reason, the preferred screening arrangement 26, which is reproduced in the FIGS. 1 and 2 consists of an inner layer 28 and a second layer 29. The inner layer 28 is formed by a film of a metal of high magnetic permeability, for example a mu-metal foil, whilst the second layer 29, which forms the middle layer of the sheath 3, is formed by a foil of a metal of high electrical conductivity, for example a film of aluminium or copper.

The inner layer 28, formed by the mu-metal foil, of the sheath 3 lies directly on the outside of the second protective layer 12 of the core 2, is however displaceable relative to this second protective layer 12, whereby the flexibility of the cable 1 is increased and a fold formation is avoided even when the cable is bent at small radii of curvature. The mu-metal foil 28 is so laid around the cable core 2 that its longitudinal edges extend parallelly to the longitudinal direction of the cable 1 and mutually overlap in the overlapping region 30. The mu-metal foil 28 can be coated with an electrically conducting copolymer which serves for the welding together of the overlapping longitudinal edges. Lying directing on the mu-metal foil 28 and in electrical contact with it is then the aluminium or copper foil 29, which is preferably coated with a copolymeric, electrically conductive synthetic material. The longitudinal edges of this aluminium or copper foil likewise extend parallelly to the longitudinal direction of the cable 1 and mutually overlap in the overlapping region 31, where they are so welded together with the aid of the copolymeric coating that the aluminium or copper foil 29 forms an absolutely water-tight and vapour-tight sheathing for all cable parts lying inside. In order to protect the copper or aluminium foil 29 against chemical effects coming from outside, the sheath 3 possesses an outer layer 27, which preferably consists of polyethylene or a similar synthetic material and through appropriate admixture of an electrically conductive substance, such as for example lampblack or graphite, displays an electrical conductivity which is preferably greater than or equal to the electrical conductivity of the soil, in which the cable is to be laid, and smaller than the electrical conductivity of the aluminium or copper foil forming the middle layer 29. This foil with the aid of its copolymer coating is also welded together with the outer layer 27 of the sheath 3.

The cable thus formed can still be surrounded by a rodent protection which is not illustrated in the figures. Likewise, a lead sheath, which is not illustrated in the figures, can be provided within the outer layer 27 in order to protect the interior of the cable against radioactive radiation.

In the just described build-up of the cable sheath 3, the inner layer 28 of a mu-metal foil primarily takes over the protection against magnetic fields coming from outside, whilst the middle layer 29, formed by a foil of copper or aluminium, forms a Faraday cage which protects against electric fields. It is in that case surprising that the protective effect of the middle layer 29 is re-inforced to quite an appreciable degree through the presence of the mu-metal foil 28 lying inside so that the penetration of longitudinal voltages into the interior of the cable is avoided in spite of the small thickness of both the foils even when a lightning strikes the cable. Since the middle layer 29 of the cable 1 "carries off" the electrical mass that is "visible" to the lightning from the distance or the further surroundings of the strike point into the immediate proximity thereof, the lightning would, if the outer layer 27 were to consist of an electrically non-conducting material, puncture the capacitor formed on the one hand by the soil and on the other hand by the layer 29 and in that case at least locally damage the outer layer 27 to such an extent or destroy it that it could no longer exert its protective effect against chemical influences at this point. Due to the fact that the outer layer 27 possesses a conductivity lying between the conductivity of the soil and the conductivity of the middle layer 29, the formation of a capacitor of that kind is avoided and the electrical charge introduced by the lightning into the soil can get without destruction to the middle layer 29 of the cable sheath 3 and flow away continuously to "earth" in longitudinal direction by way of this layer. The increased conductivity of the outer layer 27 in that case facilitates the flowing-back of the electrical charges, which are disposed on the middle layer 29, by way of the soil to "earth".

Figure 3:
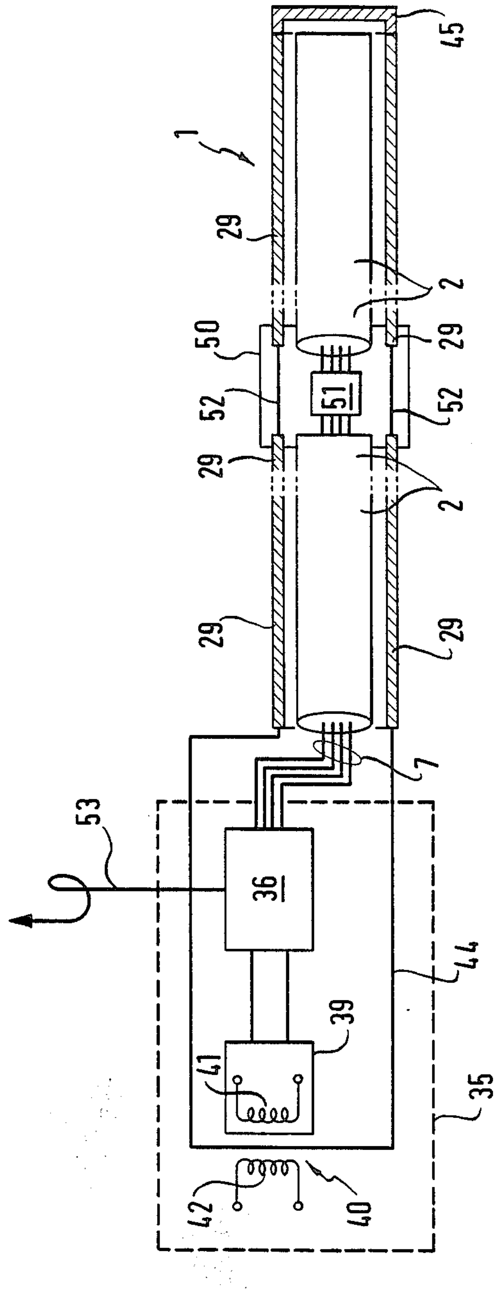

In FIG. 3, the core leads 7 of a cable 1, according to the invention and of which only the cable core 2 and the sheath layer 29 possessing a high electrical conductivity are reproduced, are connected at the one cable end with a central control and measurement unit, which is indicated by a dashed line. This central control and measurement unit comprises a series of electronic circuits which are symbolised by the block 36 and serve for the driving of the circuit units disposed in the cable 1 as well as also for the reception, evaluation and in a given case for indication of the information data delivered by these circuit units as well as also for the monitoring and regulation of the supply voltage, which is fed by way of two of the core leads 7 to the circuit units (not illustrated here) disposed in the cable 1. For this purpose, the electronic circuits 36 stand in electrically conductive connection with the cable core leads 7.

Furthermore, the central control and measurement unit 35 comprises a current supply unit 39, which supplies the electrical energy required for operation of the electronic circuits 36 as well as also the circuit units disposed in the cable 1.

In principle, this electrical energy could be taken from batteries, yet a transformer 40 is preferably provided, of which merely the primary winding 42 and the secondary winding 41 are illustrated in symbolic manner. Beyond that, the central control and measurement unit 35 comprises an electrically conductive screening arrangement 44, which encloses all parts of the central control and measurement unit 35, which are in electrically conductive connection with the cable 1, i.e. thus in particular the electronic circuits 36 and the current supply unit 39 and protects these against electrical disturbances coming from outside. This screening arrangement 44 is electrically conductively connected with the electrically well-conducting layer 29 of the cable, which layer displays an electrically conducting end termination 45 at the illustrated stub end of the cable. Furthermore, a connecting unit 50, into which respective cable portions enter from two sides, is illustrated in FIG. 3 between two "interruptions" of the cable 1, which shall merely symbolise the great length of the cable. The connecting unit 50 serves as a housing for circuit units 51, which can or shall not be integrated directly in the cable 1, but stand in electrically conductive connection with at least some of the cable core leads 7 and are for example supplied by way of these also with the electrical energy required for their operation. For the protection of these circuit units 51, the connecting unit 50 displays an electrically well-conducting screening arrangement 52, which, with the exception of the entry and exit openings for the cable 1, completely encloses the circuit units 51 and stands in electrically conductive contact with the electrically well-conducting layers 29 of the cable portions, with which the connecting unit 50 is connected, so that it forms a part of a Faraday cage which encloses the entire system. Although FIG. 3 shows only a single connecting unit 50, which connects two cable portions one with the other, a plurality of such connecting units 50 can be provided, which according to requirement can each time also connect more than two cable portions one with the other.

It is essential that the screening arrangements 44 and 52, the electrically well-conducting layers 29 and the end termination or terminations 45 form a completely closed Faraday cage which is not interrupted by electrical conductors at any place. Since the primary winding 42 of the transformer 40 shall in some manner be connected to a current supply mains, it is arranged externally of the screening arrangement 44, whilst the secondary winding 41 is disposed within the Faraday cage. The energy required for the current supply of the electronic circuits 36 as well as of the circuit units 10 in the cable 1 is thus fed in purely magnetic manner from outside into the Faraday cage.

When it is required between the ends of the cable to feed information data in and out through the Faraday cage, then this takes place exclusively with the aid of non-conductors, for example with the aid of optical fibers, along which no electrical charges can be brought into the interior of the cage. Data produced by the electronic circuits 36 can be brought to indication within the Faraday cage, for which the reading-off of the indicator units takes place in optical manner through an opening of the cage. Should these data be transferred to other units, then also their output out of the central control and measurement unit takes place in optical manner as symbolised by the optical fibre 53 ending in an arrow point.

What I claim is:

1. A cable having a cable core comprising a plurality of electronic circuit units which in particular comprises measuring sensors and are arranged spaced apart from each other and distributed over the length of the cable, and several conductors at least some of which are connected in an electrically conductive manner with said electronic circuit units, and a protective multi-layer sheath surrounding said core, wherein said sheath comprises at least an inner layer, a middle layer and an outer layer, the inner layer comprising of a material of high magnetic permeability, the middle layer consisting of a material of high electrical conductivity and the outer layer serving for protection against chemical influences coming from outside.

2. A cable according to claim 1, wherein said inner layer of the sheath consists of a mu-metal and wherein said middle layer of the sheath consists of aluminum or copper.

3. A cable according to claim 1, wherein said middle layer of the sheath is a foil of a metal of high electrical conductivity, which is so laid around said inner layer of the sheath that its edges extending in longitudinal direction of the cable overlap in an overlapping region which is constructed as a moisture barrier.

4. A cable according to claim 1, wherein said middle layer of the sheath is welded together with said outer layer of the sheath.

5. A cable according to claim 1, wherein said middle layer of the sheath and/or said inner layer of the sheath are each coated with an electrically conductive copolymer by the aid of which said layers are welded together.

6. A cable according to claim 1, wherein said outer layer of the sheath consists of a material which is flame-resistant.

7. A cable according to claim 1, wherein said outer layer of the sheath consists of a material which is electrically conductive.

8. A cable according to claim 7, wherein the electrical conductivity of said outer layer of the sheath is greater than or equal to the electrical conductivity of a surrounding medium, into which the cable is to be laid, and smaller than the electrical conductivity of said middle layer of the sheath.

9. A cable according to claim 7 or 8, wherein said outer layer of the sheath consists of a synthetic material which is filled with a material causing its electrical conductivity.

10. A cable according to claim 1, wherein at least one end of the cable is connected with a central control and measurement unit driving said electronic circuit units and/or detecting and evaluating the information signals delivered by said electronic circuit units, said central control and measuring unit having a screening arrangement enclosing all circuit parts thereof, and wherein at least said middle layer of the sheath of the cable is electrically conductively so connected with said screening arrangement that said core of the cable together with said circuit parts of said central control and measuring unit is enclosed in a Faraday cage.

11. A cable according to claim 10, wherein an electric power supply for said electronic circuit units, which are arranged in the core of the cable, is arranged in said central control and measurement unit and consists of a battery arrangement arranged internally of said Faraday cage.

12. A cable according to claim 10, wherein an electric power supply for said electronic circuit units, which are arranged in the core of the cable, is arranged in said central control and measurement unit and consists of a transformer, a primary winding of which is arranged externally of said Faraday cage, and a secondary winding of which is arranged internally thereof.

13. A cable according to one of claims 10 to 12, wherein individual cable portions are connected one with the other by means of connecting units which serve as a housing of further electronic circuit units being electrically connected with some of said conductors in the core of the cable, and wherein each of said connecting units has an individual electrically conductive screening arrangement which is electrically conductively connected with said middle layer of the sheath of the cable portions entering into the respective connecting unit so that it is part of said Faraday cage.

14. A cable according to claim 1, wherein said sheath comprises a further layer which serves for radiation screening and is arranged internally of said outer layer of the sheath.

15. A cable according to claim 1, wherein said conductors and said electronic circuit units are embedded in a material forming an inner protective layer of said core of the cable.

16. A cable according to claim 15, wherein said material, which forms said inner protective layer of the core is an insulating material.

17. A cable according to claim 15, wherein said material, which forms said inner protective layer of the core, is electrically conductive, and wherein a thin film of insulating material is provided between it and at least the electrically conductive parts of said electronic circuit units and said conductors of the cable.

18. A cable according to claim 15, wherein a traction relief is provided for said inner protective layer of the core.

19. A cable according to claim 15, wherein a second protective layer, which is movable relative to said inner protective layer, is arranged around said inner protective layer in the core of the cable.

20. A cable according to claim 19, wherein said second protective layer consists of an insulating material.

21. A cable according to claim 19, wherein said second protective layer is electrically conductive.

22. A cable according to claim 1, wherein said inner layer of the sheath rests on the outside of the core and is movable relative to the core.

23. A cable according to claim 1, wherein said electronic circuit units are built up as integrated circuits.

24. A cable according to claim 1 or 23, wherein said electronic circuit units are built up as hybrid circuits.

25. A cable according to claim 23, wherein each electronic circuit unit comprises a substrate which carries electronic and electrical components and has printed lines for the electrical connection of these components as well as electrically conducting connection surfaces by way of which it is electrically conductively connected with said conductors of the core of the cable.

26. A cable according to claim 25, wherein said substrate has connection pins with the aid of which said printed lines are electrically conductively connected with said conductors of the core of the cable.

27. A cable according to claim 26, wherein said connection pins extend substantially in longitudinal direction of the cable beyond an edge of said substrate and are provided with an arcuately curved, laterally sharp-edged portion which extends convexly to almost below the surface of said inner protective layer of the core of the cable.

* * * * *